(12) United States Patent
Hung et al.

(10) Patent No.: US 7,068,443 B1
(45) Date of Patent: Jun. 27, 2006

(54) ZOOM MECHANISM OF IMAGING LENS MODULE

(75) Inventors: Hui-Lun Hung, Chung Ho (TW); Kuo Wen Chang, Chung Ho (TW)

(73) Assignee: Nucam Corporation, Taipei (TW)

( * ) Notice: Subject to any disclaimer, the term of this patent is extended or adjusted under 35 U.S.C. 154(b) by 0 days.

(21) Appl. No.: 11/072,283

(22) Filed: Mar. 7, 2005

(51) Int. Cl.
*G02B 15/14* (2006.01)

(52) U.S. Cl. ..................... 359/699; 359/694
(58) Field of Classification Search ............... 359/819, 359/821, 822, 823, 811, 699, 700, 694
See application file for complete search history.

(56) References Cited

U.S. PATENT DOCUMENTS 5,488,513 A * 1/1996 Tanaka ................. 359/699
6,072,639 A * 6/2000 Onda ................... 359/694
6,741,400 B1 * 5/2004 DiRisio ................ 359/699

* cited by examiner

*Primary Examiner*—Dang X. Hung
*Assistant Examiner*—M. Hasan
(74) *Attorney, Agent, or Firm*—Rosenberg, Klein & Lee

(57) ABSTRACT

A zoom mechanism of imaging lens module is disclosed which includes a first lens carrier defining an optical axis, a second lens carrier, a spring connecting with the two lens carriers, a guiding means, a rotary cylinder for holding the two lens carriers and a stationary cylinder for holding the rotary cylinder. The rotary cylinder defines two cam rims, each cam rim has a stem, a beginning rim, an end rim, a guiding rim connecting with the beginning rim and the end rim, wherein the beginning rim and the end rim are formed perpendicular to the optical axis and arranged to space a certain distance therebetween in circumferential direction and axial direction respectively. The spring and the rotary cylinder push the two cam rims to move along the guiding means. The stationary cylinder defines a leading slot which extends in circumferential direction and radial direction for the stem passing through.

7 Claims, 8 Drawing Sheets

ZOOM MECHANISM OF IMAGING LENS MODULE

1. Field of the Invention

The present invention relates to a zoom mechanism. More particularly, the invention relates to a zoom mechanism of imaging lens module suitable for compact electronic equipments.

2. The Related Art

In recent years, compact electronic equipments with photographic function, such as simple cameras, mobile phones and PDAs, have been more and more popular. These compact electronic equipments have become so small that they require zoom mechanisms to be configured therein be preferable to have a small size and simple structure as much as possible.

U.S. Pat. No. 6,369,956 issued on Apr. 9, 2002 discloses a zoom mechanism which moves two lens groups along an optical axis. The zoom mechanism has a plurality of rotary feed cylinders and linear movement cylinders. Each lens group connects with one linear movement cylinder. Rotation of the rotary feed cylinders drives the linear movement cylinders move along the optical axis, which further bring the two lens groups moving along the optical axis. So many parts of the zoom mechanism make it complex, bulky, costly, and troublesome to assemble. Therefore, the zoom mechanism is not suitable for compact electronic equipments.

U.S. Pat. No. 6,741,400 issued on May 25, 2004 discloses another zoom mechanism which moves two lens groups along an optical axis. The zoom mechanism has a first lens carrier, a second lens carrier, a spring and a cam cylinder. The first lens carrier is connected to a driver. Axial slots are provided on the first lens carrier for guiding the second lens carrier. Each carrier has a set of cam followers. The cam cylinder provides with teeth on the outer surface thereof for mating with the driver to position the lens carriers and two cam tracks extending away from in inner surface thereof. In zooming, the driver is adjusted to mate with these teeth, hence the first lens carrier is turned about the optical axis, at the same time, the cam tracks of the cam followers guide the lens carriers moving along the optical axis. The zoom mechanism is still complicated in structure and large in size. Therefore, the zoom mechanism is not suitable for compact electronic equipments either.

SUMMARY OF THE INVENTION

An object of the present invention is to provide a zoom mechanism of imaging lens module which is simple in structure, small in size, cheap in cost, and easy to assemble.

To achieve the above object, the present invention provides a zoom mechanism of imaging lens module comprising a first lens carrier adapted to fix a lens unit which defines an optical axis, said the first lens carrier having a first cam follower; a second lens carrier adapted to fix a lens unit which is, the second lens carrier having a second cam follower; a rotary cylinder having a tubular wall surrounding a passage for holding the first lens carrier and the second lens carrier, the rotary cylinder being coaxial with said optical axis, the rotary cylinder having at least a portion cut out to define a first cam rim and a second cam rim, each cam rim having a guiding rim, a beginning rim and an end rim, wherein the beginning rim and the end rim are formed perpendicular to said optical axis and are arranged to space a certain distance therebetween in circumferential direction and axial direction respectively, the guiding rim connects the beginning rim and the end rim; at least one spring urging the first cam follower of the first lens carrier and the second cam follower of the second lens carrier to lean against the first cam rim and the second cam rim respectively; a guiding means guiding the first lens carrier and the second lens carrier moving along said optical axis; a stationary cylinder having a tubular wall surrounding a passage for holding the rotary cylinder, the stationary cylinder defining a leading slot extending in circumferential direction and radial direction; and a stem fixed to the rotary cylinder and passing through the leading slot. Therefore, pushing the stem to rotate the rotary cylinder, the cam rims and the spring push the lens carriers to move along the optical axis linearly.

According to the mentioned above, the zoom mechanism of imaging lens module has a small number of parts including one stationary cylinder, one rotary cylinder, one or more spring, and two lens carriers. Therefore, the zoom mechanism of imaging lens module is simple in structure, small in size, cheap in cost, and easy to assemble, which is suitable for compact electronic equipments.

BRIEF DESCRIPTION OF THE DRAWINGS

The present invention will be apparent to those skilled in the art by reading the following description of embodiments thereof, with reference to the attached drawings, in which.

DETAILED DESCRIPTION OF THE PREFERRED EMBODIMENTS

Figure 1:
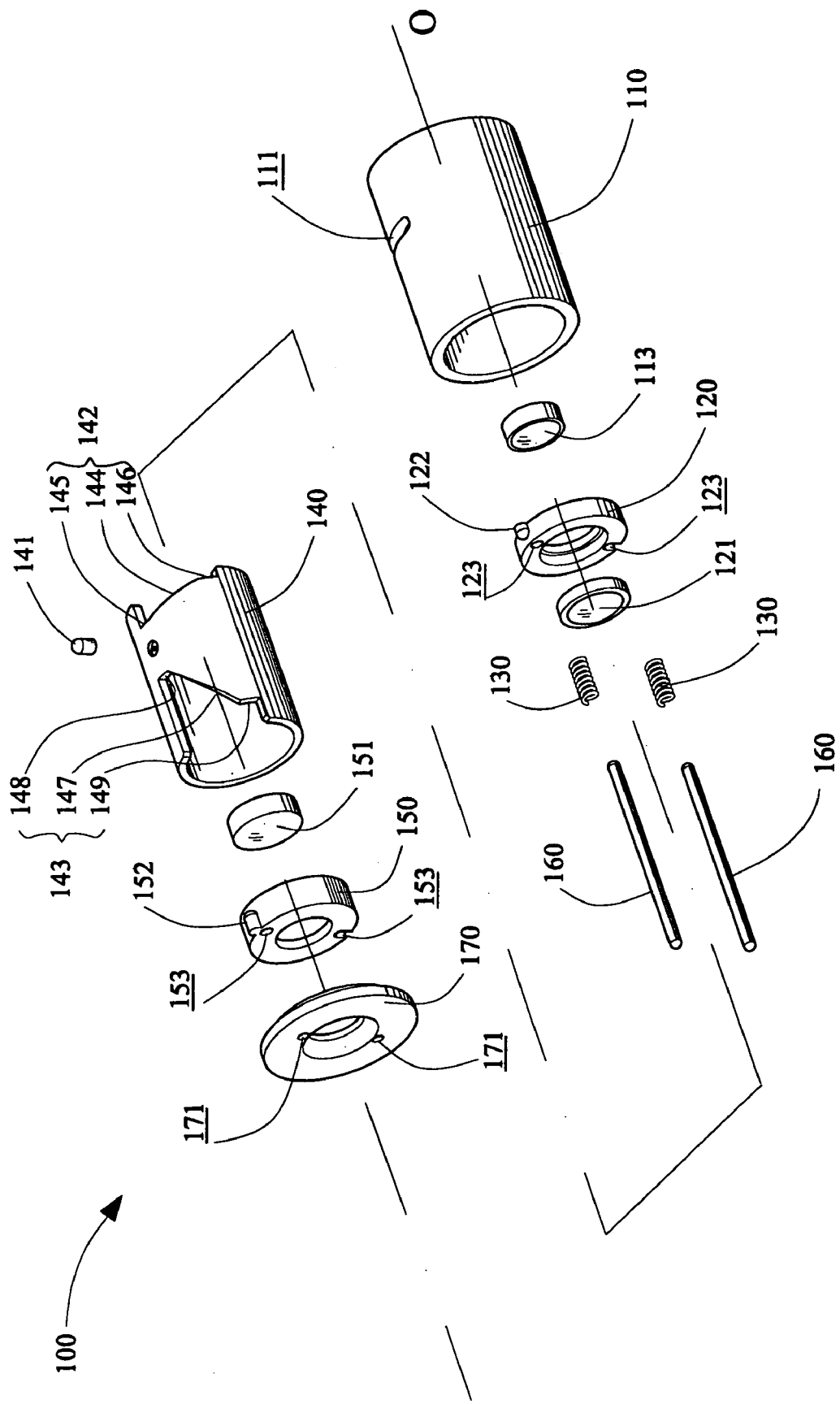
FIG. 1 is an exploded view of a first embodiment of a zoom mechanism of imaging lens module according to the present invention.
Figure 2:
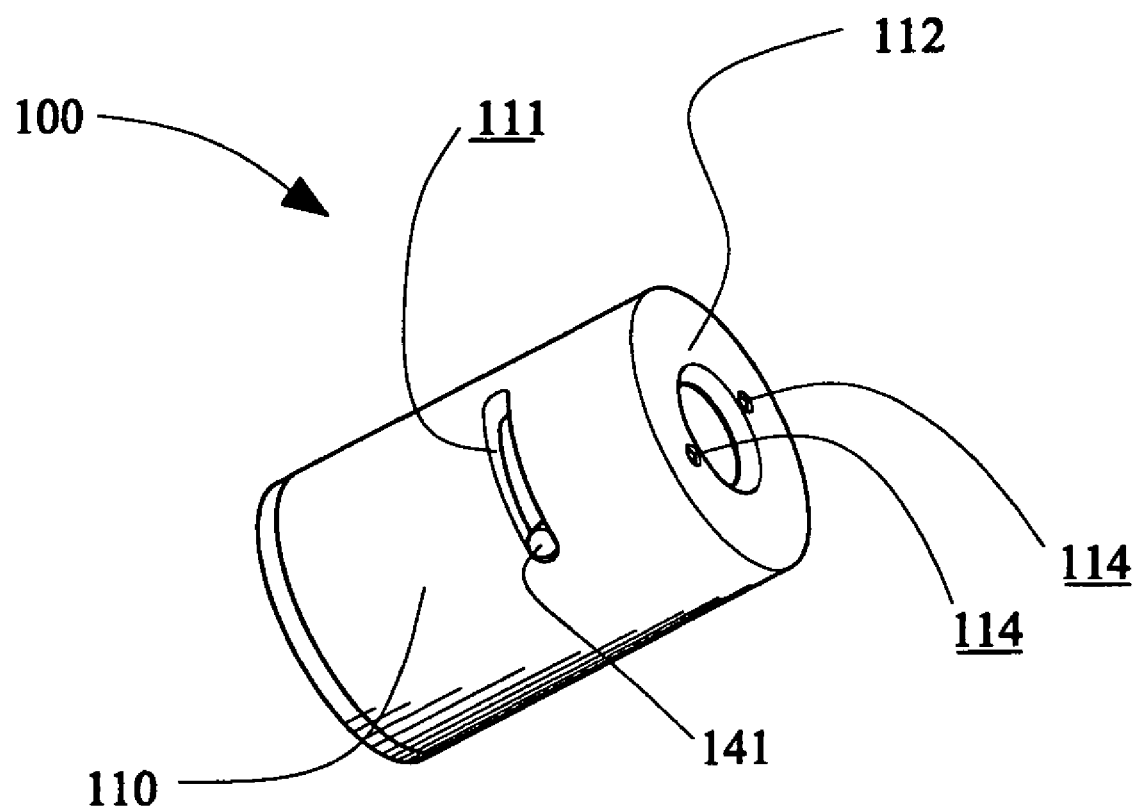
FIG. 2 is an assembled, perspective view of the zoom mechanism of imaging lens module shown in FIG. 1.

With reference to FIG. 1 and FIG. 2, a first embodiment of a zoom mechanism of imaging lens module 100 according to the present invention is shown. The zoom mechanism of imaging lens module 100 includes a stationary cylinder 110, a first lens carrier 120, a plurality of tension springs 130, a rotary cylinder 140 and a second lens carrier 150. The first lens carrier 120 defines an optical axis O. The stationary cylinder 110, the rotary cylinder 140 and the rotary cylinder 140 are coaxial with the optical axis O.

The rotary cylinder 140 has a tubular wall surrounding a passage for holding the two lens carriers 120,150. A stem 141 is fixed on the tubular wall of the rotary cylinder 140. The stem 141 may be a separate element or an integrated formed on the rotary cylinder 140. In the preferred embodiment, the stem 141 is a separate element. Opposite ends of the rotary cylinder 140 are partially cut out to form a first cam rim 142 and a second cam rim 143 respectively.

Figure 3:
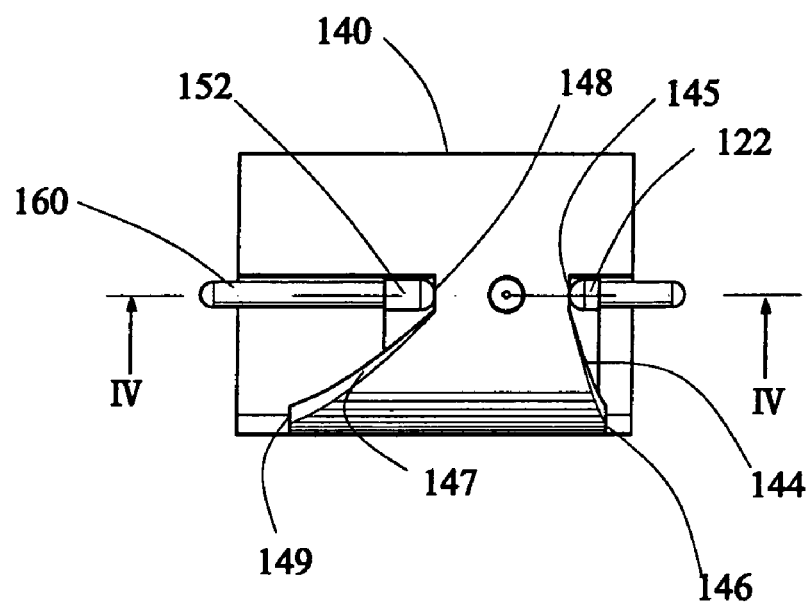
FIG. 3 is a side elevational view of the zoom mechanism of imaging lens module shown in FIG. 2, wherein a stationary cylinder of the zoom mechanism is removed, and a first lens carrier and a second lens carrier of the zoom mechanism are in the first position.
Figure 5:
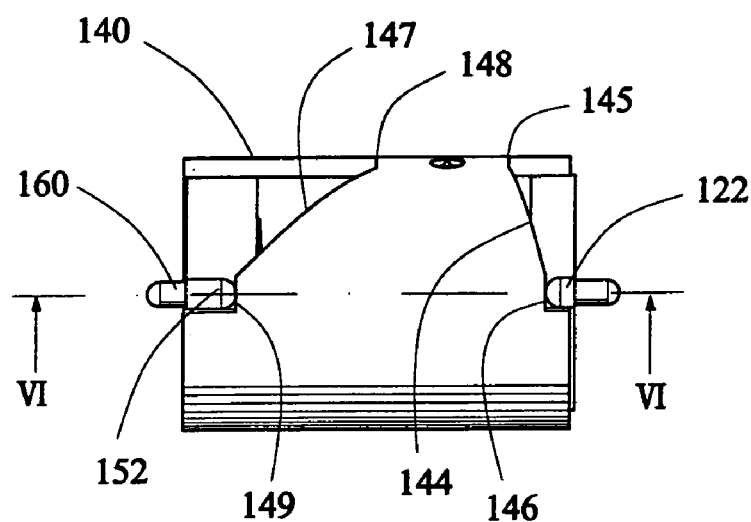
FIG. 5 is a side elevational view of the zoom mechanism of imaging lens module shown in FIG. 2, wherein the stationary cylinder is removed, and the first lens carrier and the second lens carrier are in the second position.

The first cam rim 142 has a first guiding rim 144, a first beginning rim 145 and a first end rim 146. The first beginning rim 145 and the first end rim 146 are formed perpendicularly to the optical axis O and are arranged to space a certain distance therebetween in circumferential direction and axial direction respectively. The first guiding rim 144 connects the first beginning rim 145 and the first end rim 146. The second cam rim 143, similar with the first cam rim 142, also has a second beginning rim 148, a second end rim 149 and a second guiding rim 147 connecting the second beginning rim 148 and the second end rim 149. The first and the second beginning rims 145, 148 define a first focus position of the lens carriers 120,150, as shown in FIG. 3. The first and the second end rims 145, 148 define a second focus position of the lens carriers 120, 150, as shown in FIG. 5. The first and the second guiding rims 144, 147 guide the lens carriers 120,150 from one focus position to the other.

The stationary cylinder 110 also has a tubular wall which surrounds a passage for holding the rotary cylinder 140. The tubular wall defines a leading slot 111 extending in circumferential direction and radial direction for the stem 141 of the rotary cylinder 140 passing therethrough. Pulling the stem 141 along the leading slot 111 make the rotary cylinder 140 rotate about the optical axis O. One end of the stationary cylinder 110 extends inward to form a shoulder 112 wherein a lens unit 113 is fixed, therefore, an additional lens carrier is not necessary with the result that the structure of the zoom mechanism of imaging lens module 100 is simplified further.

Figure 4:
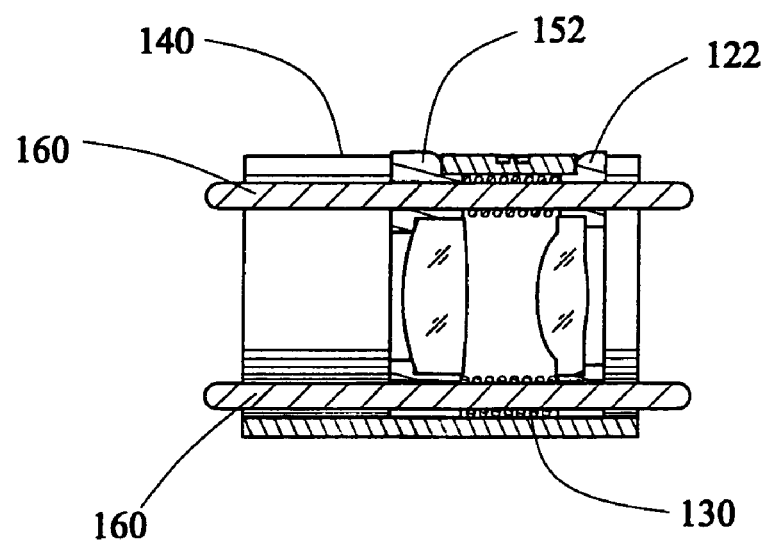
FIG. 4 is a cross-sectional view of the zoom mechanism of imaging lens module taken along line IV—IV of FIG. 3.
Figure 6:
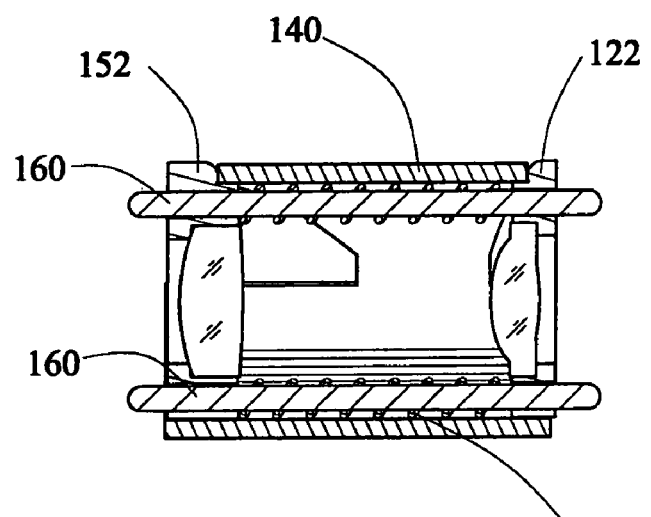
FIG. 6 is a cross-sectional view of the zoom mechanism of imaging lens module taken along line VI—VI of FIG. 5.

The lens carriers 120, 150 are used to fix lens units 121, 151 respectively. The first lens carrier 120 provides a first cam follower 122 that slides along the first cam rim 142. The second lens carrier 120 provides a second cam follower 122 that slides along the second cam rim 143. A plurality of tension springs 130 are secured between the first and the second lens carriers 120, 150 to urge the cam followers 122, 152 to lean against the cam rims 142, 143 respectively. As shown in FIG. 3 and FIG. 4, when the lens carriers 120, 150 are in the first focus position, the tension springs 130 have already had predetermined tension which urgently press the cam followers 122, 152 against the first and the second beginning rims 145, 148 respectively. When the rotary cylinder 140 is rotated by pushing the stem 141, the first and the second guiding rims 144–147 of the rotary cylinder 140 compel the cam followers 122, 152 to slide therealong to move the lens carriers 120, 150 from the first focus position to the second focus position, as shown in FIG. 5 and FIG. 6. At this time, the tension springs 130 urge the cam followers 122, 152 to lean against the first and the second end rims 146, 149. On the contrary, when the stem 141 is pulled, the tension springs 130 pull the lens carriers 120, 150 from the second focus position to the first focus position.

Besides, in order to prevent the lens carriers 120, 150 from rotating about the optical axis O in the rotating course of the rotary cylinder 140, a guiding means is provided in the zoom mechanism of imaging lens module 100. The guiding means includes two rods 160 and a fixed frame 170. The fixed frame 170 is caught in the stationary cylinder 110. Corresponding to the rods 160, each lens carrier 120, 150 defines two guiding holes 123, 153; and the fixed frame 170 and the shoulder 112 of the stationary cylinder 110 are provided with fixed holes 171, 114. One end of each rod 160 is fixed in the fixed hole 114 of the stationary cylinder 110, and the other end passes through the guiding hole 123, 153 in turn and is fixed in the fixed hole 171 of the fixed frame 170.

Assembly process of the zoom mechanism of imaging lens module 100 is described in the following according to the above-mentioned embodiment.

First, the lens units 113,121,151 are fixed in the stationary cylinder 110, the first lens carrier 120, and the second lens carrier 150 respectively. Second, the guiding rods 160 are fixed to the stationary cylinder 110. Next, the first lens carrier 120, the tension springs 130, the rotary cylinder 140 and the second lens carrier 150 are assembled in the stationary cylinder 110 in turn. Then the fixed frame 170 is caught in the stationary cylinder 110 and makes the other ends of the guiding rods 160 fixed thereon. Finally, the stem 141 passes through the leading slot 111 of the stationary cylinder 110 and is fixed to the rotary cylinder 140.

Figure 7:
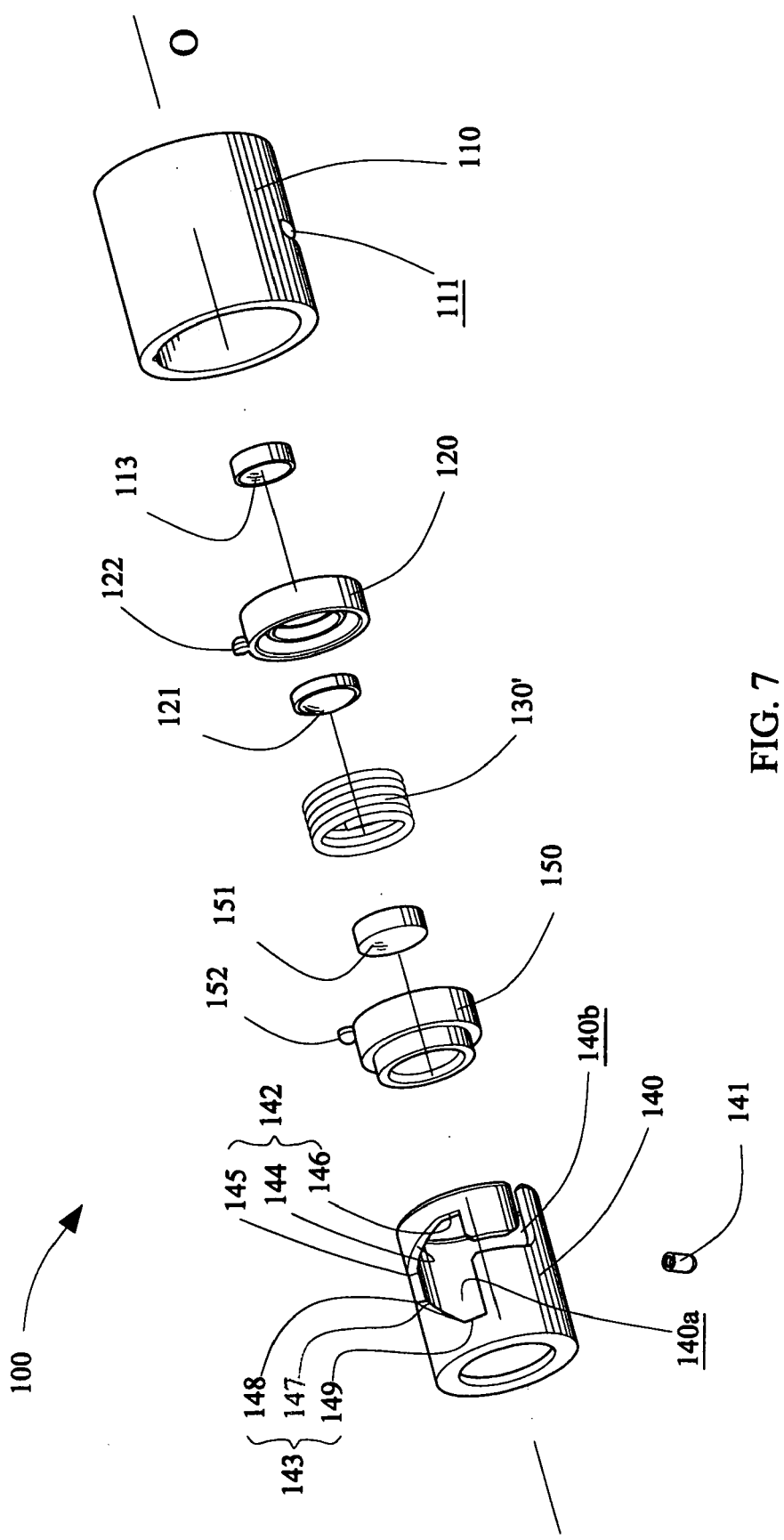
FIG. 7 is an exploded view of a second embodiment of a zoom mechanism of imaging lens module according to the present invention.
Figure 9:
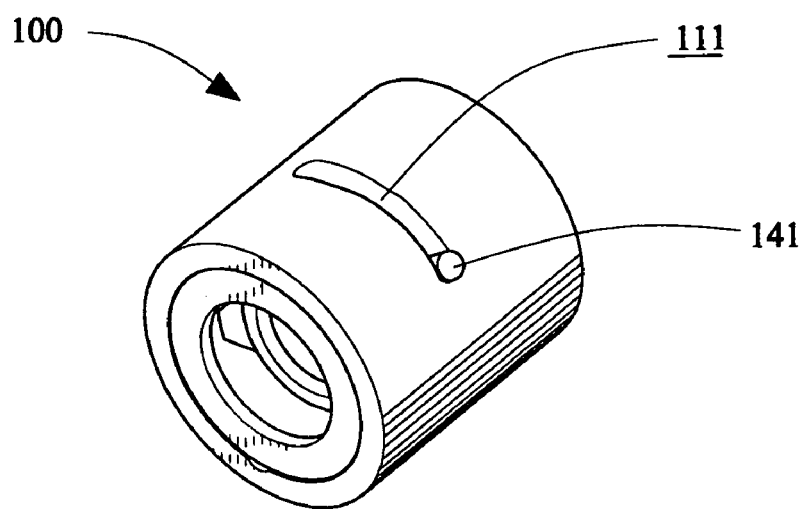
FIG. 9 is an assembled, perspective view of the zoom mechanism of imaging lens module shown in FIG. 7.
Figure 10:
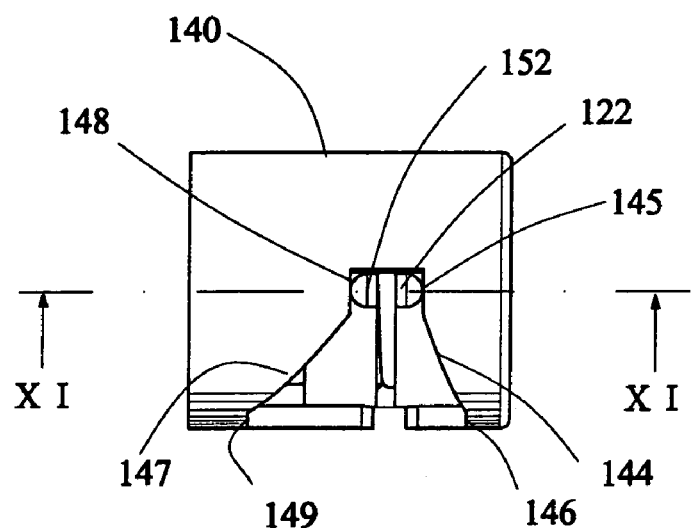
FIG. 10 is a side elevational view of the zoom mechanism of imaging lens module shown in FIG. 9, wherein the stationary cylinder is removed, and a first lens carrier and a second lens carrier of the zoom mechanism are in the first position.
Figure 11:
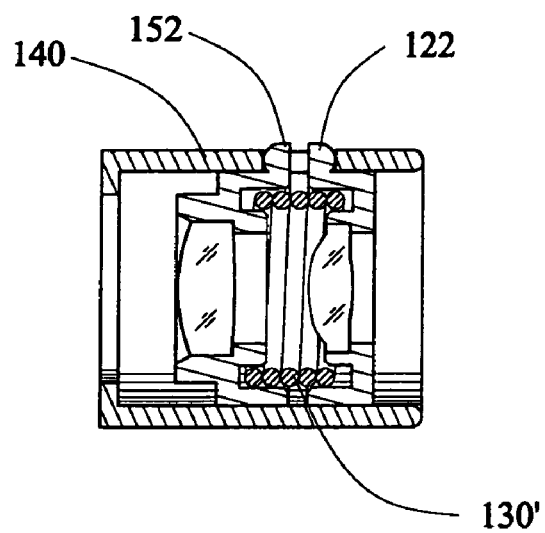
FIG. 11 is a cross-sectional view taken along line XI—XI of FIG. 10.
Figure 12:
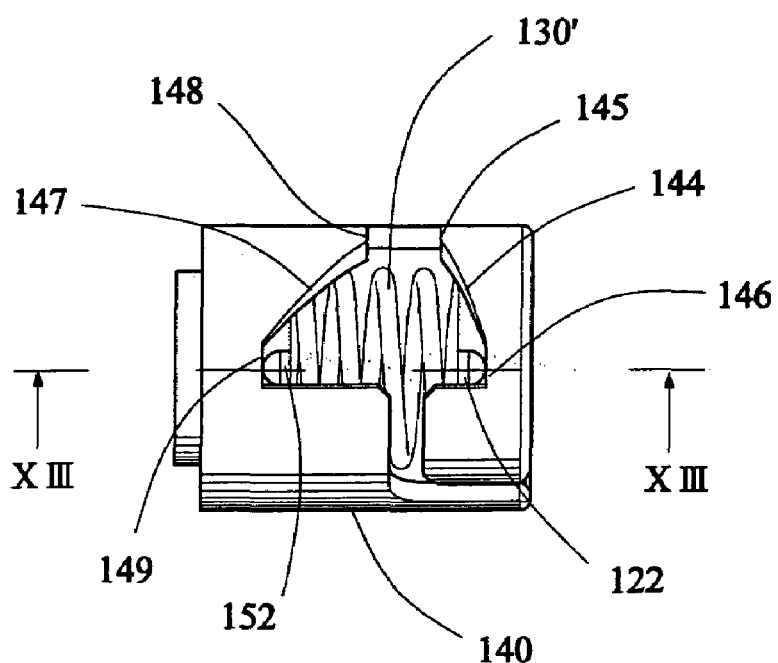
FIG. 12 is a cross-sectional view of the zoom mechanism of imaging lens module shown in FIG. 9, wherein the stationary cylinder is removed, and the first lens carrier and the second lens carrier are in the second position.
Figure 13:
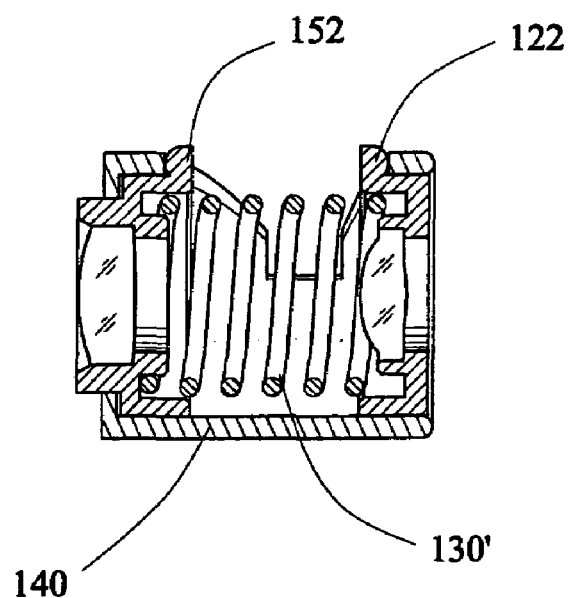
FIG. 13 is a cross-sectional view taken along line XII—XII of FIG. 12.

With reference to FIG. 7 and FIG. 9, a second embodiment of a zoom mechanism of imaging lens module 100 according to the present invention is shown. The zoom mechanism of imaging lens module 100 is similar with what is shown in the first embodiment. The difference is described in the following. The rotary cylinder 140 is provided with an opening 140a in the middle portion of the tubular wall thereof. Two opposite side edges of the opening 140a form the firs cam rim 142 and the second cam rim 143. To facilitate the cam rims 142, 143 being held in the rotary cylinder 140, a guiding slot 140b is provided extending from one end of the rotary cylinder 140 into the opening 140a. That is to say, the guiding slot 140b communicates with the opening 140a. A compression spring 130' is used in the second embodiment to replace the tension springs 130. When the lens carriers 120, 150 are disposed in the first focus position, as shown in FIG. 10 and FIG. 11, the cam followers 122, 152 are against the first and second beginning rims 145, 148 respectively. When the lens carriers 120, 150 are disposed in the second focus position, as shown in FIG. 12 and FIG. 13, the cam followers 122, 152 are against the first and second end rims 146, 149 respectively.

With reference to FIG. 9 to FIG. 13, By pushing the stem 141 along the leading slot 111 of the stationary cylinder 110, the compression spring 130' pushes the lens carriers 120, 150 to move along the optical axis O from the first focus position to the second focus position. When the stem 141 is pushed in the opposite direction, the cam rims 142, 143 compel the lens carriers 120, 150 to move from the second focus position back to the first focus position.

Figure 8:
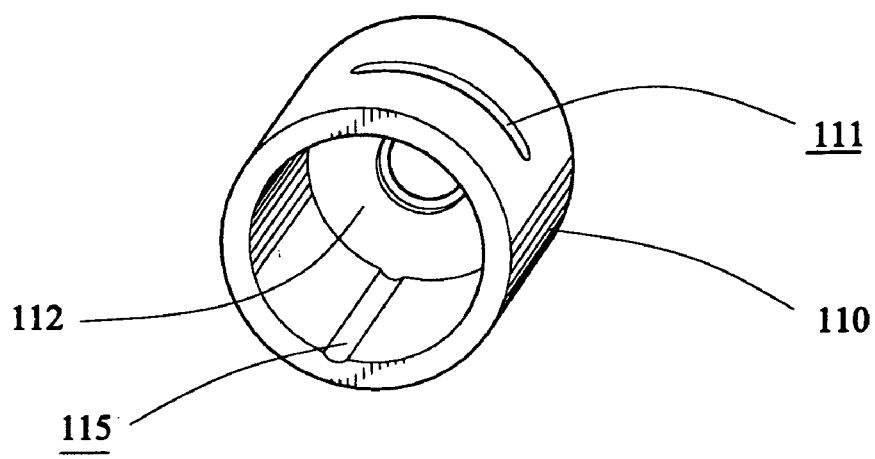
FIG. 8 is a perspective view of a stationary cylinder of the zoom mechanism shown in FIG. 7.

Besides, in order to prevent the lens carriers 120, 150 from rotating around the optical axis O in the rotating course of the rotary cylinder 140, the guiding means in the second embodiment is a leading groove 115 which is defined in the inner surface of the tubular wall of the stationary cylinder 110, and the leading groove 115 is parallel with the optical axis O, as shown in FIG. 8. The cam followers 122, 152 are inserted in the leading groove 115, therefore the lens carriers 120, 150 can not rotate about the optical axis O, but only move along the optical axis O.

Assembly process of the zoom mechanism of imaging lens module 100 disclosed in second embodiment is described in the following.

First, the lens units 113,121,151 are fixed in the stationary cylinder 110, the first lens carrier 120, and the second lens carrier 150 respectively. Second, the second lens carrier 150, the compression spring 130', and the first lens carrier 120 are assembled in the rotary cylinder 140 in turn. Then, the rotary cylinder 140 is installed in the stationary cylinder 100. , Finally, the stem 141 passes through the leading slot 111 of the stationary cylinder 110 and is fixed to the rotary cylinder 140.

According to the foregoing description, the zoom mechanism of imaging lens module 100 has a small number of parts including one stationary cylinder 110, one rotary cylinder 140, one or more spring 130 or 130', and two lens carriers 120, 150. Pushing the stem 141 to rotate the rotary cylinder 140, the cam rims 142, 143 and the spring 130 or 130' push the lens carriers 120, 150 to move along the optical axis O. The zooming process is simple. Therefore, the zoom mechanism of imaging lens module 100 is simple in structure, small in size, cheap in cost, and easy to assemble, which is suitable for compact electronic equipments.

What is claimed is:

1. A zoom mechanism of imaging lens module, comprising:
   a first lens carrier adapted to fix a lens unit which defines an optical axis, said the first lens carrier having a first cam follower;
   a second lens carrier adapted to fix a lens unit which is coaxial with said optical axis, the second lens carrier having a second cam follower;
   a rotary cylinder having a tubular wall surrounding a passage for holding the first lens carrier and the second lens carrier, the rotary cylinder being coaxial with said optical axis, the rotary cylinder having at least a portion cut out to define a first cam rim and a second cam rim, each cam rim having a guiding rim, a beginning rim and an end rim, wherein the beginning rim and the end rim are formed perpendicular to said optical axis and are arranged to space a certain distance therebetween in circumferential direction and axial direction respectively, the guiding rim connects the beginning rim and the end rim;
   at least one spring urging the first cam follower of the first lens carrier and the second cam follower of the second lens carrier to lean against the first cam rim and the second cam rim respectively;
   a guiding means guiding the first lens carrier and the second lens carrier moving along said optical axis; a stationary cylinder having a tubular wall surrounding a passage for holding the rotary cylinder, the stationary cylinder defining a leading slot extending in circumferential direction and radial direction; and
   a stem fixed to the rotary cylinder and passing through the leading slot.

2. The zoom mechanism of imaging lens module as claimed in claim 1, wherein said stationary cylinder has a shoulder extending inward from one end thereof for holding a lens unit.

3. The zoom mechanism of imaging lens module as claimed in claim 2, wherein said guiding means comprises at least one rod and a fixed frame, said fixed frame is fixed in the stationary cylinder, each lens carrier defines a guiding hole corresponding to the rod, one end of the rod is fixed to the shoulder, and the other end passes through the guiding hole of the first and second lens carriers and is fixed to the fixed frame.

4. The zoom mechanism of imaging lens module as claimed in claim 1, wherein said guiding means comprises a leading groove which is defined in the inner surface of the tubular wall of the stationary cylinder and is parallel with the optical axis.

5. The zoom mechanism of imaging lens module as claimed in claim 1, wherein the first cam rim and the second cam rim are formed in opposite ends of the rotary cylinder.

6. The zoom mechanism of imaging lens module as claimed in claim 1, wherein said rotary cylinder is provided with an opening in a middle portion of the tubular wall thereof, opposite side edges of the opening forms the firs cam rim and the second cam rim.

7. The zoom mechanism of imaging lens module as claimed in claim 6, wherein the rotary cylinder further defines a guiding slot, which extends from one end thereof and communicates with said opening.

* * * * *